United States Patent [19]

Ando

[11] Patent Number: 4,842,288
[45] Date of Patent: Jun. 27, 1989

[54] KEYLESS CHUCK

[75] Inventor: Takaharu Ando, Aichi, Japan

[73] Assignee: EMU-ESU Industrial Co., Ltd., Nishio, Japan

[21] Appl. No.: 162,207

[22] Filed: Feb. 29, 1988

[30] Foreign Application Priority Data

Jul. 3, 1987 [JP] Japan ................. 62-103098

[51] Int. Cl.$^4$ ............................................. B23B 31/04
[52] U.S. Cl. .......................................... 279/62; 279/60
[58] Field of Search ............... 279/1 K, 1 DA, 61, 62, 279/65, 60

[56] References Cited

U.S. PATENT DOCUMENTS

| | | | |
|---|---|---|---|
| 1,473,488 | 11/1923 | McConnell | 279/62 |
| 1,476,903 | 12/1923 | McConnell | 279/62 |
| 1,513,332 | 10/1924 | McConnell | 279/62 |
| 1,532,329 | 4/1925 | McConnell | 279/62 |
| 3,000,642 | 9/1961 | Kawasaki | 279/62 |
| 3,807,745 | 4/1974 | Bent | 279/60 |

FOREIGN PATENT DOCUMENTS 0188354 7/1986 European Pat. Off. .
3411127 10/1985 Fed. Rep. of Germany ........ 279/62

Primary Examiner—Gil Weidenfeld
Assistant Examiner—Daniel W. Howell
Attorney, Agent, or Firm—Cushman, Darby & Cushman

[57] ABSTRACT

A keyless chuck comprises a plurality of jaws slidably fitted respectively in bores formed in a body. A substantially cylindrical, first operating component is mounted on the body rotatably and axially movably, and is provided with female threads in engagement with male threads on the respective jaws. A substantially cylindrical, second operating component is mounted on the first operating component for angular and axial movement. A cam device is arranged between the second operating component and an end member fixedly mounted to the rear end of the body. When the second operating component is angularly moved in a first direction, the cam device moves the second operating component forwardly to cause at least one projection provided on the second operating component to move forwardly the first operating component and the jaws threadedly engaged therewith. When the second operating component is angularly moved in the opposite second direction, the cam device allows the second operating component to be moved rearwardly.

7 Claims, 3 Drawing Sheets

KEYLESS CHUCK

BACKGROUND OF THE INVENTION

The present invention relates to a keyless chuck for gripping an article such as a tool or the like.

A conventionally known drill chuck will be described with reference to FIGS. 1 and 2 of the accompanying drawings. The drill chuck comprises a body 1 which is formed therein with three inclined bores 2. The inclined bores 2 are arranged circumferentially about an axis of the body 1. A plurality of jaws 3 are fitted respectively in the bores 2 for sliding movement therealong. A cover 4 is rotatably mounted about the body 1. Gear teeth 6 are integrally formed at a forward end of the cover 4. An annular member 7 is force-fitted in the cover 4 and is provided with female threads 8 which is in engagement with male threads 9 formed respectively on the jaws 3. A chuck key 11 separate from the body 1 has a bevel gear 12 and a boss 13 projecting therefrom. The body 1 is formed with a bore 14 for receiving therein the boss 13 of the chuck key 11.

In use, with the jaws 3 retracted respectively into the inclined bores 2, an article such as a tool is inserted into an opening defined between forward ends of the respective jaws 3. The boss 13 of the chuck key 11 is inserted into the bore 14 in the body 1 to bring the bevel gear 12 of the chuck key 11 into engagement with the gear teeth 6 on the cover 4. The chuck key 11 is rotated to rotate the cover 4 in the clockwise direction as indicated by the arrow 15 in FIG. 1. The annular member 7 is rotated together with the cover 4 in the direction indicated by the arrow 15 so that the jaws 3 threadedly engaged with the annular member 7 is advanced respectively along the inclined bores 2 to the right-hand direction as viewed in FIG. 1. Thus, the forward ends of the respective jaws 3 move toward each other to grip therebetween the article. When it is desired to remove the article from the drill chuck, the chuck key 11 is rotated to rotate the cover 4 in the counterclockwise direction opposite to the direction indicated by the arrow 15. Rotation of the cover 4 in the counterclockwise direction causes the jaws 3 to be moved rearwardly respectively along the bores 2. Thus, the forward ends of the respective jaws 3 move away from each other to release the article from the jaws 3.

It is necessary for the conventional drill chuck described above to insert the boss 13 of the chuck key 11 into the bore 14 in the body 1 and to rotate the chuck key 11 at each time the article is gripped by the jaws 3 and is released therefrom. Thus, the conventional drill chuck is cumbersome in operation and low in operating efficiency. Further, since the chuck key 11 is separate from the body 1, the chuck key 11 might sometimes be lost or mislaid. Should the chuck key 11 be lost or mislaid, it would become impossible to perform requisite operations.

SUMMARY OF THE INVENTION

It is an object of the invention to provide a keyless chuck in which it is possible to move jaws by operating components mounted on a body without the use of a separate chuck wrench, and in which it is possible to enhance gripping force of the jaws to ensure gripping of an article such as a tool.

According to the invention, there is provided a keyless chuck for gripping an article such as a tool, the keyless chuck comprising:

a body having formed therein a plurality of bores arranged about an axis of the body, the bores having their respective one ends opening at an axial one end face of the body, the bores having their respective axes inclined along the axis of the body so as to diverge toward the other axial end of the body;

a plurality of jaws fitted respectively in the bores for sliding movement therealong, each of the jaws being formed with male threads;

a substantially cylindrical, first operating component mounted on the body for rotation relative thereto about the axis of the body in a first rotational direction and a second rotational direction opposite thereto, the first operating component being movable along the axis of the body in a first axial direction away from the other axial end of the body and in a second axial direction opposite to the first axial direction, the first operating component being provided with female threads in engagement with the male threads on the respective jaws so that rotation of the first operating component in the first rotational direction causes the jaws to be moved respectively along the bores in the body away from the other axial end thereof to enable the jaws to grip therebetween the article, and rotation of the first operating component in the second rotational direction causes the jaws to be moved respectively along the bores in the body toward the other axial end thereof to permit the article to be released from the jaws;

a substantially cylindrical, second operating component mounted about an outer peripheral surface of the first operating component for angular movement in the first and second rotational directions and for movement in the first and second axial directions, the second operating component having at least one projection extending radially inwardly, the projection being located in engaging relation to an axial end face of the first operating component remote from the axial one end face of the body;

an end member fixedly mounted to the body adjacent the other axial end thereof; and cam means arranged between the second operating component and the end member for moving the second operating component in the first axial direction when the second operating component is angularly moved in one of the first and second rotational directions, to cause the projection of the second operating component to move the first operating component in the first axial direction thereby moving the jaws threadedly engaged with the first operating component respectively along the bores in the body away from the other axial end of the body, and for enabling the second operating component to be moved in the second axial direction when the second operating component is angularly moved in the other of the first and second rotational directions.

DETAILED DESCRIPTION

The invention will be described in detail, by way of mere example, with reference to FIGS. 3 through 17.

Figure 3:
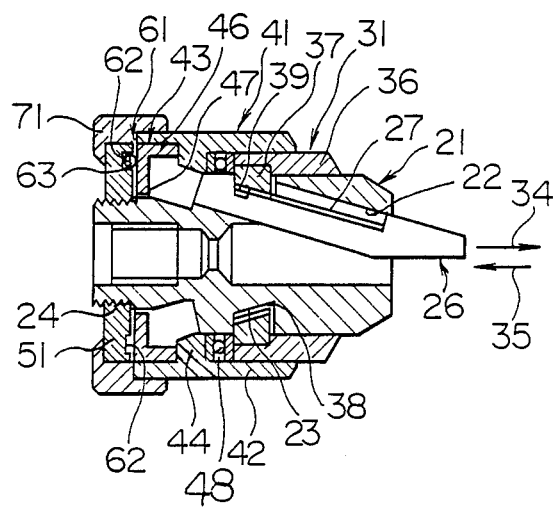
FIG. 3 is a longitudinal cross-sectional view of a keyless chuck according to an embodiment of the invention.
Figure 4:
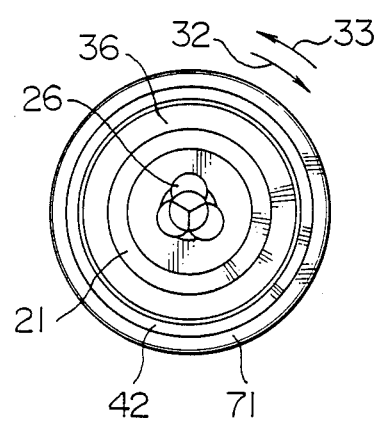
FIG. 4 is a front elevational view of the keyless chuck illustrated in FIG. 3.
Figure 5:
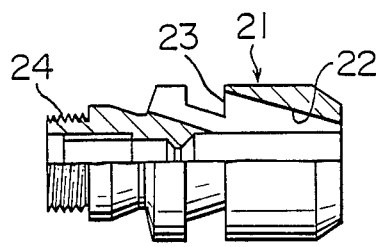
FIG. 5 is a partially cross-sectional view of a body illustrated in FIG. 3.
Figure 6:
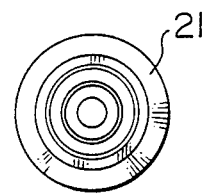
FIG. 6 is a rear view of the body illustrated in FIG. 5.

Referring to FIGS. 3 and 4, there is shown an embodiment of a keyless chuck according to the invention. The keyless chuck comprises a body 21 shown in FIGS. 5 and 6. The body 21 is formed therein with three bores 22 which are arranged in equidistantly spaced relation to each other circumferentially about an axis of the body 21. The bores 22 have their respective one ends which open at axial one end face (hereinafter, referred to as "forward end face") of the body 21. The bores 22 are partially overlapped with each other at the forward end face of the body 21 to define a single opening. The bores 22 have their respective axes inclined along the axis of the body 21 so as to diverge toward the other axis end (hereinafter, referred to as "rear end") of the body 21. An annular groove 23 is formed in an outer peripheral surface of the body 21 at its axially middle location. The annular groove 23 is in communication with the bores 22. Male threads 24 are formed on the outer peripheral surface of the rear end portion of the body 21.

Figure 7:
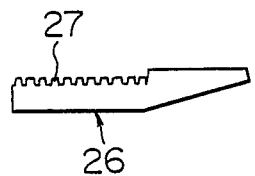
FIG. 7 is a side elevational view of one of jaws illustrated in FIG. 3.
Figure 8:
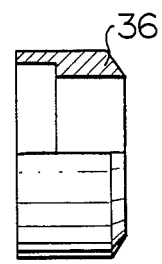
FIG. 8 is a partially cross-sectional view of a cylindrical cover illustrated in FIG. 3.
Figure 9:
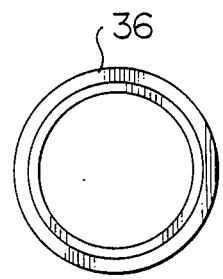
FIG. 9 is a rear view of the cylindrical cover illustrated in FIG. 8.
Figure 10:
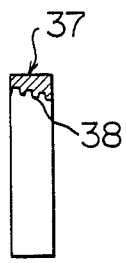
FIG. 10 is a partially cross-sectional view of an internally threaded annular member illustrated in FIG. 3.
Figure 11:
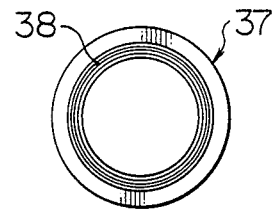
FIG. 11 is a rear view of the internally threaded annular member illustrated in FIG. 10.
Figure 12:
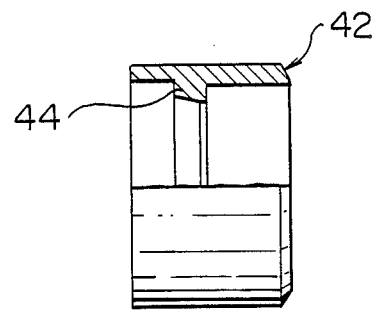
FIG. 12 is a partially cross-sectional view of a sleeve illustrated in FIG. 3.
Figure 13:
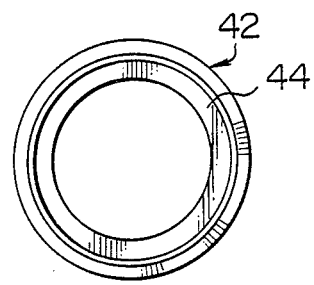
FIG. 13 is a front elevational view of the sleeve illustrated in FIG. 12.
Figure 14:
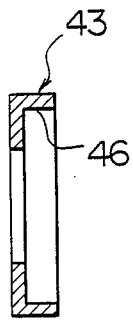
FIG. 14 is a cross-sectional view of a pressure receiving member illustrated in FIG. 3.
Figure 15:
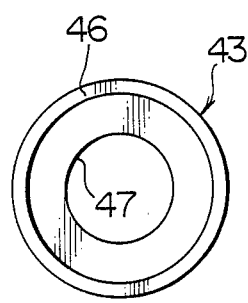
FIG. 15 is a front elevational view of the pressure receiving member illustrated in FIG. 14.

Referring back to FIGS. 3 and 4, jaws 26 shown in FIG. 7 are fitted respectively in the bores 22 in the body 21 for sliding movement along the bores 22. Male threads 27 are formed on a radially outward surface of each of the jaws 26.

A substantially cylindrical, first operating component, generally designated by the reference numeral 31 in FIG. 3, is mounted on the body 21 for rotation relative thereto about the axis of the body 21 in a first rotational direction, i.e., in the clockwise direction indicated by the arrow 32 in FIG. 4 and in a second rotational direction opposite to the first rotational direction 32, indicated by the arrow 33. In addition, the first operating component 31 is movable relative to the body 21 along the axis thereof in a first axial direction away from the rear end of the body 21, indicated by the arrow 34 in FIG. 3 and in a second axial direction opposite to the first axial direction 34, indicated by the arrow 35. The first operating component 31 comprises a cylindrical cover 36 shown in FIGS. 8 and 9, and an annular member 37 shown in FIGS. 10 and 11. The cover 36 is fitted about the outer peripheral surface of the body 21. The annular member 37 is fixedly mounted to an inner peripheral surface of the cover 36 by means of, for example, force-fitting. The annular member 37 is fitted in the annular groove 23 in the body 21. The annular member 37 has its axial width slightly less than that of the annular groove 23 in the body 21 so as to define a slight axial gap 38 between the annular member 37 and the annular groove 23, thereby permitting the annular member 37 to be slightly moved axially. The annular member 37 has an inner peripheral surface formed with female threads 39 which are in engagement with the male threads 27 on the respective jaws 26. Thus, rotation of the cover 36 and the annular member 37 fixedly mounted thereto in the first rotational direction 32 is transmitted to the jaws 26 through the engagement between the female threads 39 on the annular member 37 and the male threads 27 on the jaws 26, to move the jaws 26 respectively along the bores 22 away from the rear end of the body 21. On the other hand, rotation of the cover 36 and the annular member 37 fixedly mounted thereto in the second rotational direction 33 causes the jaws 26 to be moved respectively along the bores 22 toward the rear end of the body 21.

A substantially cylindrical, second operating component, generally designated by the reference numeral 41 in FIG. 3, is mounted on the outer peripheral surface of the first operating component 31 for angular movement in the first and second rotational directions 32 and 33 and for axial movement in the first and second axial directions 34 and 35. The second operating component 41 comprises a cylindrical sleeve 42 shown in FIGS. 12 and 13, and a pressure receiving member 43 shown in FIGS. 14 and 15. The sleeve 42 is integrally provided with an annular projection 44 which extends radially inwardly from an inner peripheral surface of the sleeve 42. The pressure receiving member 43 is fixedly mounted to the inner peripheral surface of a rear end portion of the sleeve 42 adjacent the rear end of the body 21 by means of, for example, force-fitting. The pressure receiving member 43 has a cylindrical wall portion 46 and an end flange portion 47 extending radially inwardly from a rear end of the cylindrical wall portion 46. The cylindrical wall portion 46 has its axial front end face which is abutted against an axial rear end face of the annular projection 44 on the sleeve 42. A thrust bearing 48 is arranged between the axial front end face of the annular projection 44 on the sleeve 42 and the axial rear end face of the cover 36 of the first operating component 31. Thus, the annular projection 44 of the sleeve 42 is located in engaging relation to the axial rear end face of the cover 36 of the first operating component 31 through the thrust bearing 48.

Figure 16:
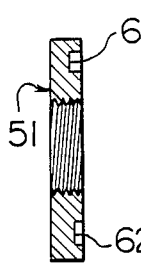
FIG. 16 is a cross-sectional view of an end member illustrated in FIG. 3.
Figure 17:
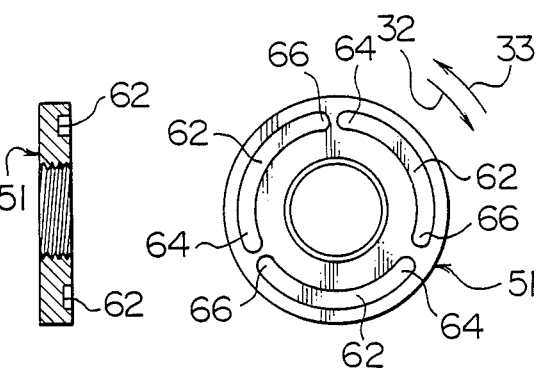
FIG. 17 is a front elevational view of the end member illustrated in FIG. 16.

An end member 51 shown in FIGS. 16 and 17 is threadedly engaged with the male threads 24 provided on the rear end of the body 21. The end member 51 is fixed to the body 21 against rotation and axial movement relative thereto. The end member 51 has its axial front end face which is confronted with the axial rear end face of the end flange portion 47 of the pressure receiving member 43.

A cam device 61 is arranged between the second operating component 41 and the end member 51. When the second operating component 41 is angularly moved in one of the first and second rotational directions 32 and 33, the cam device 61 moves the second operating component 41 in the first axial direction 34 to cause the annular projection 44 on the second operating component 41 to move the first operating component 31 in the first axial direction 34. Movement of the first operating component 31 in the first axial direction 34 causes the jaws 26 threadedly engaged with the first operating component 31 to be moved respectively along the bores 22 in the body 21 away from the rear end thereof. On the other hand, when the second operating component 41 is angularly moved in the other of the first and second rotational directions 32 and 33, the cam device 61 allows the second operating component 41 to be moved in the second axial direction 35. In the illustrated embodiment, the cam device 61 comprises three arcuate grooves 62 formed in the axial front end face of the end plate 51 as shown in FIGS. 16 and 17, and rolling members or balls 63 received respectively in the arcuate grooves 62 for rolling therealong. The arcuate grooves 62 have their respective radii of curvature having a common center of curvature located on the axis of the body 21, and are arranged in equidistantly spaced relation to each other circumferentially about the axis of the body 21. Each of the arcuate grooves 62 has a bottom surface which is sloped from its one end 64 to the other end 66 so that the arcuate groove has its depth gradually decreasing along the first rotational direction 32. Each of the balls 63 has a diameter slightly larger than the maximum depth of a corresponding one of the arcuate grooves 62 at its one end 64. Thus, the balls 63 received respectively in the arcuate grooves 62 are in rolling contact with the axial rear end face of the end flange portion 47 of the pressure receiving member 43.

Referring back to FIGS. 3 and 4, a rear cover 71 is fixedly fitted about an outer periphery of the end member 51. The rear end of the sleeve 42 of the second operating component 41 is loosely fitted in the rear cover 71.

The operation of the keyless chuck constructed as mentioned above will be described below.

With the jaws 26 retracted respectively into the bores 22, an article such as a tool is inserted in an opening defined between the forward ends of the respective jaws 26. Then, the cover 36 is rotated in the first rotational direction 32. Rotation of the cover 36 is transmitted to the jaws 26 through the engagement between the female threads 39 on the annular member 37 and the male threads 27 on the respective jaws 26. The jaws 26 are moved respectively along the bores 22 such that the forward ends of the respective jaws 26 move toward each other, to thereby grip the article between the jaws 26. At this time, gripping force acting on the article due to the jaws 26 is relatively low. Subsequently, the sleeve 42 is angularly moved in the first rotational direction 32 to angularly move the pressure receiving member 43 fixedly mounted to the sleeve 42. The balls 63 of the cam device 61 roll respectively along the arcuate grooves 62 toward their respective shallow other ends 66 shown in FIG. 17, due to friction between the balls 63 and the axial rear end face of the end flange portion 47 of the pressure receiving member 43. Since the end member 51 is immovable axially relative to the body 21, the balls 63 gradually project from the axial forward end face of the end member 51 as the balls 63 roll toward the shallow other ends 66 of the respective arcuate grooves 62. Thus, the balls 63 urge the axial rear end face of the end flange portion 47 of the pressure receiving member 43, to cause the pressure receiving member 43 and the sleeve 42 fixedly mounted thereto to be moved in the first axial direction 34. The annular projection 44 on the sleeve 42 applies urging force in the first axial direction 34 to the axial rear end face of the cover 36 through the thrust bearing 48. By the urging force, the jaws 26 threadedly engaged with the annular member 37 fixedly mounted to the cover 36 is urged away from the rear end of the body 21. Thus, the article gripped between the jaws 26 is gripped thereby further tightly.

On the other hand, when it is desired to remove the article from the keyless chuck, the sleeve 42 is first moved angularly in the second rotational direction 33. Angular movement of the sleeve 42 in the second rotational direction 33 causes the balls 63 of the cam device 61 to roll respectively along arcuate grooves 62 toward their respective deep one ends 64, to thereby permit the sleeve 42 to be moved in the second axial direction 35. Thus, the urging force having applied to the cover 36 and the annular member 37 is released to allow the cover 36 to be rotated in the second rotational direction 33. As the cover 36 is rotated in the second rotational direction 33, the jaws 26 are moved respectively along the bores 22 toward the rear end of the body 21, to release the article from the jaws 26.

The invention should not be limited to the above-described embodiment, but various modifications and changes may be made to the invention. For example, the cam device 61 may comprise, in substitution for the balls 63, a plurality of projections which are provided on the axial rear end face of the end flange portion 47 of the pressure receiving member 43 and which are engaged respectively with the sloped bottom surfaces of the respective arcuate grooves 62. Alternatively, the cam device 61 may comprises a plurality of projections provided on the axial front end face of the end member 51 and a plurality of projections provided on the axial rear end face of the end flange portion 47 of the pressure receiving member 43 in respective engagement with the projections on the end member 51. Further, the arcuate grooves 62 may be formed in the axial rear end face of the end flange portion 47 of the pressure receiving member 43, in substitution for the axial front end face of the end member 51. Rollers may be employed in substitution for the balls 63. Moreover, the slope applied to the bottom surface of each of the arcuate grooves 62 of the cam device 61 may be reverse in inclination. In this case, angular movement of the second operating component 41 in the second rotational direction 33 causes the cam device 61 to move the second operating component 41 in the first axial direction 34.

Figure 1:
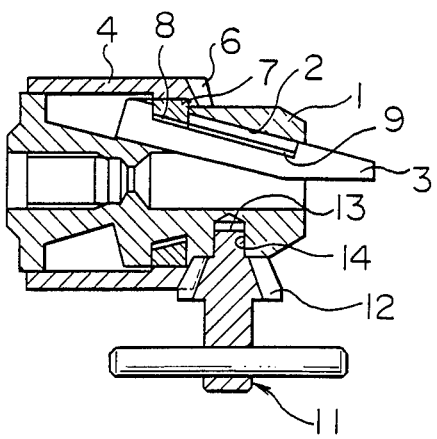
FIG. 1 is a longitudinal cross-sectional view of a drill chuck according to the prior art.
Figure 2:
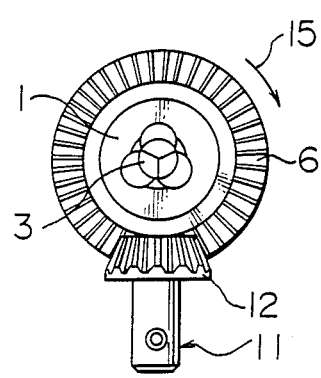
FIG. 2 is a front elevational view of the drill chuck illustrated in FIG. 1.

As described above, in the keyless chuck according to the invention, the first and second operating components 31 and 32 for moving the jaws 26 respectively along the bores 22 are always mounted on the body 21. Accordingly, it is possible for the invention to facilitate the operation of the keyless chuck and to increase the operating efficiency, as compared with the conventional chuck described with reference to FIGS. 1 and 2, which employs the chuck wrench separate from the body. In addition, since it is possible for the invention to prevent the chuck wrench from being lost or mislaid, the invention is advantageous in the management point of view and can avoid that the operations become impossible due to loss or mislaying of the chuck wrench. Furthermore, since it is possible for the invention to enhance the gripping force acting on an article such as a tool by angular movement of the second operating component 41, it can be ensured to grip the article by the jaws 26. By these reasons, the invention is advantageously applicable, in particular, to electrically operated tools of portable type.

What is claimed is:

1. A keyless chuck for gripping an article such as a tool, said keyless chuck comprising:

a body having formed therein a plurality of bores arranged about an axis of the body, said bores having their respective one ends opening at an axial one end face of said body, said bores having their respective axes inclined along the axis of said body so as to diverge toward the other axial end of said body;

a plurality of jaws fitted respectively in said bores for sliding movement therealong, each of said jaws being formed with male threads;

a substantially cylindrical, first operating component mounted on said body for rotation relative thereto about the axis of said body in a first rotational direction and a second rotational direction opposite thereto, said first operating component being movable along the axis of said body in a first axial direction away from the other axial end of said body and in a second axial direction opposite to said first axial direction, said first operating component being provided with female threads in engagement with said male threads on the respective jaws so that rotation of said first operating component in said first rotational direction causes said jaws to be moved respectively along said bores in said body away from the other axial end thereof to enable said jaws to grip therebetween the article, and rotation of said first operating component in said second rotational direction causes said jaws to be moved respectively along said bores in said body toward the other axial end thereof to permit the article to be released from said jaws;

a substantially cylindrical, second operating component mounted about an outer peripheral surface of said first operating component for angular movement in said first and second rotational directions and for movement in said first and second axial directions, said second operating component having at least one projection extending radially inwardly, said projection being located in engaging relation to an axial end face of said first operating component remote from said axial one end face of said body, said second operating component comprising a cylindrical sleeve fitted about the outer peripheral surface of said first operating component, and a pressure receiving member, said projection being in the form of an annular projection formed on an inner peripheral surface of said sleeve, said pressure receiving member having a cylindrical wall portion fixedly fitted in an end portion of said sleeve adjacent the other axial end of said body, and a flange portion extending radially inwardly from said cylindrical wall portion and confronted with said end member;

an end member fixedly mounted to said body adjacent the other axial end thereof; and cam means arranged between said flange portion and said end member for moving said second operating component in said first axial direction when said second operating component is angularly moved in one of said first and second rotational directions, to cause said projection of said second operating component to move said first operating component in said first axial direction thereby moving said jaws threadedly engaged with said first operating component respectively along said bores in said body away from the other axial end of said body, and for enabling said second operating component to be moved in said second axial direction when said second operating component is angularly moved in the other of said first and second rotational directions.

2. A keyless chuck as defined in claim 1, wherein said end member has an axial end face confronted with an axial end face of said second operating component remote from said axial one end face of said body, and wherein said cam means comprises a plurality of arcuate grooves formed in one of said axial end face of said end member and said axial end face of said second operating component, and a plurality of rolling members received respectively in said arcuate grooves in rolling contact with the other of said axial end face of said end member and said axial end face of said second operating component, said arcuate grooves having their respective radii of curvature having a common center of curvature located on the axis of said body, said arcuate grooves being arranged in circumferentially spaced relation to each other about the axis of said body, each of said arcuate grooves having a bottom surface sloped from one end of the arcuate groove to the other end thereof.

3. A keyless chuck as defined in claim 2, wherein each of said rolling members is a ball.

4. A keyless chuck as defined in claim 2, wherein said arcuate grooves are formed in said axial end face of said end member.

5. A keyless chuck as defined in claim 1, wherein said first operating component comprises a cylindrical 6. A keyless chuck as defined in claim 1, wherein said cylindrical wall portion of said pressure receiving member of said second operating component has an axial end face remote from the other axial end of said body, said axial end face of said cylindrical wall portion being abutted against an axial one end face of said annular projection adjacent the other axial end of said body.

7. A keyless chuck as defined in claim 6, including bearing means arranged between the other axial end face of said annular projection and said axial end face of said first operating component.

* * * * *